United States Patent [19]

Pompier

[11] Patent Number: 4,922,981
[45] Date of Patent: May 8, 1990

[54] TIRE RIM COMPRISING A BODY TO ALLOW TIRE TO ROLL IN A DEFLATED CONDITION

[75] Inventor: Jean-Pierre Pompier, Volvic, France

[73] Assignee: Campagnie Generale des Establissements Michelin-Michelin & Cie, Clermont-Ferrand, France

[21] Appl. No.: 262,291

[22] Filed: Oct. 25, 1988

[30] Foreign Application Priority Data

Oct. 26, 1987 [FR] France ................................. 87 14895

[51] Int. Cl.⁵ ...................... B60B 21/02; B60C 17/06
[52] U.S. Cl. .................................. 152/158; 152/382; 152/520
[58] Field of Search ............... 152/427, 516, 520, 157, 152/381.3, 158, 382, 400, 383; 301/97, 65

[56] References Cited

U.S. PATENT DOCUMENTS 1,254,016 1/1918 Anderson ............................ 152/382
3,426,821 2/1969 Boileau ................................ 152/158

FOREIGN PATENT DOCUMENTS 349936 7/1905 France .
0375234 7/1907 France ................................ 152/158
60-219101 11/1985 Japan .

Primary Examiner—Raymond Hoch
Attorney, Agent, or Firm—Oblon, Spivak, McClelland, Maier & Neustadt

[57] ABSTRACT

Disclosed is a rim intended to form a safety unit with a tire and a body of foam rubber, which gives the tire the ability to roll in a deflated state. Lateral walls of a central groove receiving the body each include an undercut portion to retain the body effectively. The groove is delimited on opposite sides by lateral walls. The groove has an orifice formed therein for communication with atmospheric pressure.

4 Claims, 2 Drawing Sheets

TIRE RIM COMPRISING A BODY TO ALLOW TIRE TO ROLL IN A DEFLATED CONDITION

BACKGROUND OF THE INVENTION

1. Field of the Invention

This invention relates to rims for tires specifically designed to achieve a safety unit comprising, besides the rim and tire, an approximately toroidal body of cellular rubber, intended to support the load in case of pressure loss of the tire.

2. Discussion of the Background

Such safety devices are known from U.S. Pat. No. 3,426,821 which discloses the operating principle and describes the behavior of a cellular rubber body under the effect of centrifugal force. Such proposes putting the radially inside face of the body in communication with atmospheric pressure, while the inflation pressure acts on the radially outside face of this body. From this pressure difference a pressure directed radially inward results which the centrifugal force must compensate for before being able to separate the body from the rim well.

This arrangement proves insufficient for maintaining the body flat against the rim well, especially because of the high speeds of which passenger vehicles are now capable.

SUMMARY OF THE INVENTION

This invention aims at improving the anchoring of a body of cellular rubber, also called foam rubber, while preserving to the device in its entirety (i.e., rim, tire and support body) a sufficient simplicity to reconcile the requirements of costs, ease in mounting and removal.

The solution rests on a modification of the profile of the rim making it possible to attain sufficient anchoring without it being necessary to resort to a greater complexity of the support body.

The rim according to the invention having a groove intended to receive a body, and whose meridian section has approximately a U shape whose concavity is oriented radially outward, the base of said U constituting the bottom of the groove being approximately parallel to the axis of rotation, said groove being axially delimited on both sides by lateral walls extending radially outward relative to the bottom of the groove, is characterized in that the lateral walls each comprise at least one undercut portion and in that an orifice intended to achieve communication with atmospheric pressure is provided in said groove, radially inward relative to one of said undercuts.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
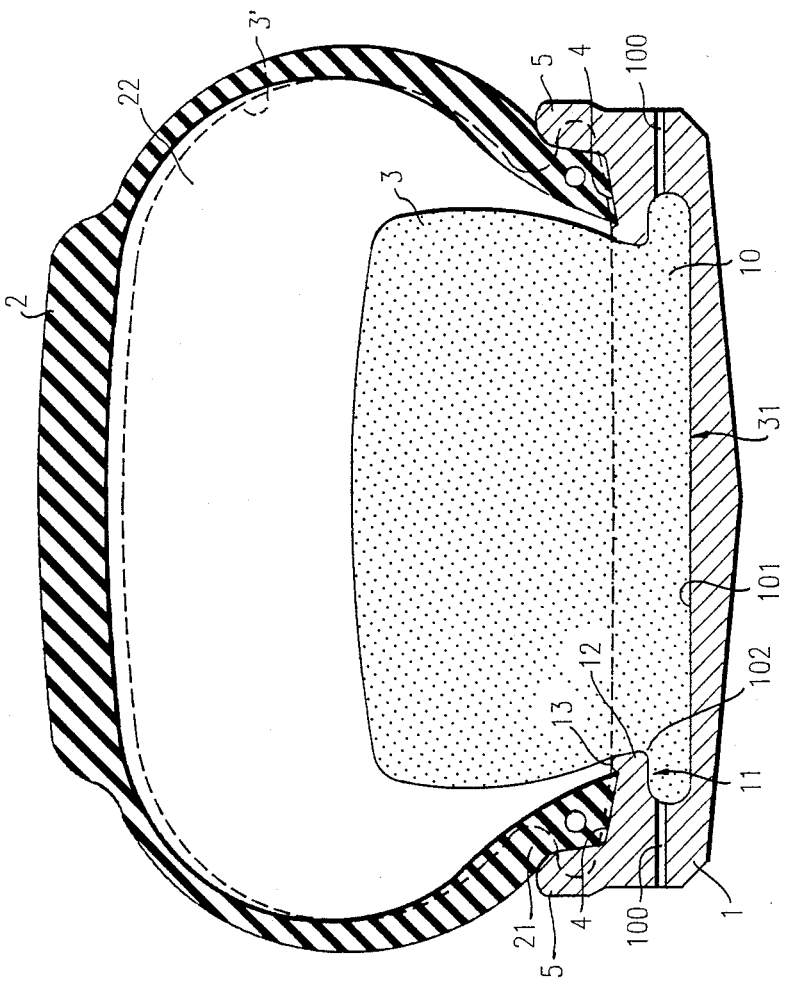
FIG. 1 shows a meridian section of a safety unit using a rim according to the present invention.

There is shown a rim 1 on which is mounted tire 2 in FIG. 1. Rim 1 is of the most common type for passenger vehicles, such being formed in a single piece and including a substantially symmetrical mounting well. This well constitutes groove 10 required by this invention. The general shape of the meridian section of said groove 10 is that of a U. Said rim 1 comprises, on both sides of said groove 10, a bead seat 4 limited axially outwardly by a rim edge 5. Bottom 101 of the groove (i.e., the base of the U) is approximately parallel to the axis of rotation of rim 1. On rim 1 is mounted a tire 1 and a body 3 of foam rubber, represented in continuous lines in the mounting position (i.e., the volume retracted under the influence of the inflation pressure, and body 3 flattened on bottom 101 of groove 10).

As is known from U.S. Pat. No. 3,426,821, there is a communication with atmospheric pressure to flatten body 3 on rim 1 by the effect of the difference of the pressure applied on radially inside face 31 of body 3 and on its radially outside face.

This communication is achieved here by an orifice 100 on each side of groove 10. Routing of the air to orifices 100 can be improved by any suitable arrangement, as, for example, striae on bottom of 101 of groove 10 or on radially inside face 31 of body 3.

Groove 10 is axially limited on both sides by two lateral walls 102. They extend radially outward. When groove 10 is constituted by the mounting well, said walls 102 are axially separated outward. This is unimportant for the embodiment of this invention. What is essential is to have, on each of these lateral walls 102, an undercut portion 11. For example, the latter is obtained by providing a boss 12 made on the same principle as hump 13 axially maintaining bead 21 of tire 2.

Anchoring of body 3 therefore is obtained thanks to the fact that lateral wall 102—when moving axially inward along it—goes axially outward at least at one point. Therefore it suffices to dimension body 3 so that the latter, being mounted on the rim and being under the effect of nominal pressure, has an axial width which is, radially at the height of undercut 11, at least as wide as the space available, i.e., wider than the space available radially just above undercut 11. By way of illustration, there is shown in broken lines 3' the same body as such would be arranged, coaxially with rim 1, in the absence of any constraint due to mounting. In the condition free of any constraint, the body therefore occupies a much larger volume than in the mounted condition (i.e., body 3).

When a tubeless tire 2 is mounted as shown, body 3, on mounting, should sufficiently rest axially on boss 12 so that this zone assures sealing of pneumatic cavity 22, relative to the zone put in communication with the atmospheric pressure, limited by said bosses 12 and located radially on their inside. Body 3, notably wider than the available space, is easily inserted between bosses 12 by raising, during mounting, the inflation pressure to a sufficient value to obtain the necessary dimensional retraction, then in bringing the pressure to its nominal value. With a prestressing of body 3 against bosses 12, the effect of centrifugal force even at very low pressure, does not cause breaking of the seal at right angles with bosses 12 (i.e., the seal between pneumatic cavity 22 and the zone put in communication with atmospheric pressure).

Figure 2:
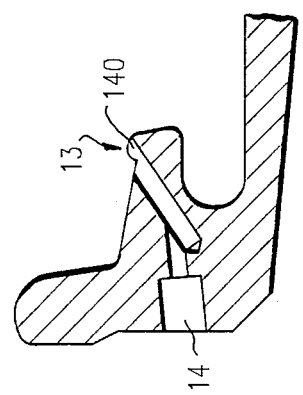
FIG. 2 shows the details of said rim.

The detail shown in FIG. 2 indicates how to place the inflation value on such a rim. There is shown a connector 14 intended to receive the valve itself. Connector 14 is extended by a duct which ends in an opening 140 placed on hump 13. At the beginning of inflation, the air escapes through orifices 100. It suffices to dimension said orifices 100 so that the escape rate is less than the inflation rate, for body 3 to take its configuration and final place, assuring the sealing of the unit. Otherwise, a temporary blocking of orifices 100 is provided.

Preferably, the profile of the rim is axially symmetrical. Therefore, the two undercuts 11, as represented, are radially at the same height but this, of course, is not essential to combat centrifuging of body 3. It is also possible to obtain an undercut 11 by inclining lateral wall 102 axially inward. Also, it is possible to use the invention with other types of rims, as for example, rims in several pieces or rims provided for reversed hooked tires. If necessary, said groove 10 comprising undercuts 12 is constituted separately from rim 1, then is attached to it.

It is also to be noted that, as appears above, orifices 100 are intended to achieve permanent communication between the base of body 3 which may be of foam rubber and atmospheric pressure but, if it is desired to drive with the rim according to the invention without equipping it with body 3 of foam, with only tire 2, it will suffice to block orifice or orifices 100 to have a rim air-tight for inflation air.

Figure 3:
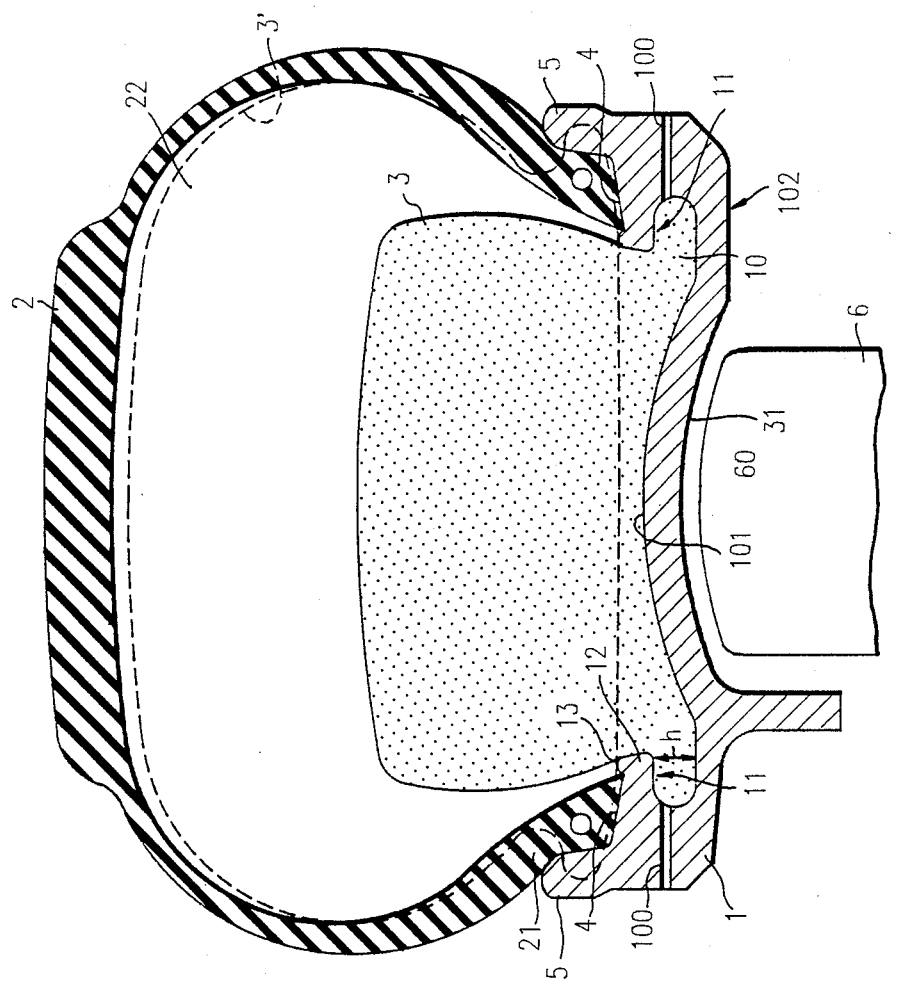
FIG. 3 shows an alternate embodiment of said rim.

FIG. 3 represents an alternate embodiment which makes it possible to reconcile desirable holding of body 3 of foam rubber with the need of leaving, under groove 10 of rim 1, a sufficient space for braking elements 6. It has been found that the limit of the speed at which the body 3 is held on bottom 101 of groove 10 is increased if height h available under undercut portion 11, between the latter and bottom 101 of groove 10, is increased. The maximum space requirements of braking elements 6 are generally due to the calipers of disk brakes. It is possible to provide a curved zone 12 on bottom 101 of groove 10, a zone whose concavity is oriented radially inward and corresponds to the protuberance caused by the calipers of the disk brakes. Since the top 60 of said calipers radially exceeds a radially lowermost point of lateral wall 102 of bottom 101 of rim 1, the rim must be engaged above caliper 6 by presenting it at a slant relative to the hub on which it will be fastened, then swinging it to its final position.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A rim for mounting a pneumatic tire, said tire being used together with a support body which makes possible the rolling of the tire in a deflated condition,
    said rim having a groove for receiving and anchoring said support body, the cross section of said groove having approximately a U shape and having a concave shape which is oriented radially outward,
    a base portion of said U shape constituting a bottom portion of said groove being approximately parallel to the axis of tire rotation,
    said groove being axially delimited on opposite sides thereof by lateral walls extending laterally outward relative to said bottom portion of said groove, wherein said lateral walls each comprise at least one undercut portion and an orifice and passageway for achieving communication with atmospheric pressure is provided in said groove located radially outward relative to one of said undercut portions.

2. A rim according to claim 1, wherein said rim is substantially symmetrical.

3. A rim according to claim 1, comprising a hump having an inflation opening formed therein.

4. A rim according to claim 1, wherein said bottom portion of said groove has a curved zone, the concavity of which is oriented radially inward.

* * * * *

UNITED STATES PATENT AND TRADEMARK OFFICE
CERTIFICATE OF CORRECTION

PATENT NO.   :   4,922,981
DATED        :   MAY 8, 1990
INVENTOR(S)  :   JEAN-PIERRE POMPIER

It is certified that error appears in the above-identified patent and that said Letters Patent is hereby corrected as shown below:

ON THE TITLE PAGE, ITEM [73]:

In the assignee's name, delete "Campagnie" and insert --Compagnie--.

Signed and Sealed this

Eleventh Day of June, 1991

Attest:

HARRY F. MANBECK, JR.

*Attesting Officer*    *Commissioner of Patents and Trademarks*